UNITED STATES PATENT OFFICE 2,473,798

NONIONIC SURFACE ACTIVE AGENT

Roy H. Kienle, Bound Brook, and Gordon P. Whitcomb, Watchung, N. J., assignors to American Cyanamid Company, New York, N. Y., a corporation of Maine No Drawing. Application July 10, 1946, Serial No. 682,584

11 Claims. (Cl. 260—29)

This invention relates to resin emulsions and more particularly, to stable emulsions of thermosetting and thermoplastic type synthetic resins.

In the past, great difficulty has been encountered in the preparation of stable resin emulsions. Solubilized casein, which is usually used as the emulsifier, requires special and careful treatment to avoid spoilation of the emulsion and loss of its viscosity.

It is an object of the present invention to prepare stable resin emulsions.

It is a further object of the present invention to prepare emulsions of thermosetting or thermoplastic synthetic resins which are stable.

Still another object of the present invention is the preparation of stable emulsions of synthetic resins which are aldehyde condensation products of urea, melamine, or a mixture of the two, or which are alkyd resins.

Another object of the present invention is to prepare stable emulsions of mixtures of alkyd resins with aldehyde condensation products of amino compounds such as urea and melamine.

These and other objects are attained by the use, as an emulsifying agent in the preparation of resin emulsions, of an ester of a dimerized fatty acid with a polyalkylene oxide having a high molecular weight.

The invention will be described in greater detail in conjunction with the following specific examples in which the proportions are given in parts by weight unless otherwise indicated. The examples are merely illustrative and are not intended to be restrictive of the scope of the invention.

Example 1

50 parts of a butylated melamine-formaldehyde resin in a mixture of 25 parts butanol and 25 parts xylol are added to 90 parts of water containing 10 parts of the ester obtained by heat treating the fatty acids of soya bean or cottonseed oil and condensing one mole of the resulting dimerized linoleic and/or linolenic acids with 2 mols of polyethylene oxide of a molecular weight of about 4000 in the presence of sulfuric acid as a catalyst. Rapid stirring is brought about during the addition by means of an emulsifying tool designed to effect very high speed localized stirring. A stable emulsion showing no separation after aging for about 12-18 hours and having a pH of approximately 3.2 is obtained. It may be homogenized if necessary.

Example 2

Example 1 is repeated except that only 4 parts of the emulsifying ester is contained in 100 parts of the aqueous solution to which is added the resin solution. The stable emulsion obtained has a pH of 4.0.

Example 3

The procedure of Example 1 is followed except that 100 parts of a 4% aqueous solution of an ester obtained by heat treating soya bean or cottonseed oil, condensing the dimerized acids obtained with 2 mols of polyethylene oxide as described in Example 1 in the presence of sulfuric acid as a catalyst, and neutralizing the sulfuric acid is substituted for the emulsifying ester described in Example 1. The emulsion obtained is stable.

Example 4

The procedure of Example 1 is followed except that 100 parts of a 4% aqueous solution of an ester obtained by heat treating soya bean or cottonseed oil and condensing 1 mol of the resulting dimerized fatty acids with 2 mols of polyethylene oxide having a molecular weight of about 6000 is substituted for the emulsifying ester of Example 1. The emulsion obtained in this case is stable in shaking although approximately 25% by volume creams upon standing.

Example 5

58 parts of an alkyd resin obtained by condensation of about 150 parts of phthalic acid anhydride, about 85 parts of glycerol and about 190 parts of castor oil are dissolved in a mixture containing 21 parts butanol and 21 parts xylol.

10 parts of a butylated urea-formaldehyde resin in a mixture of 6 parts butanol and 4 parts xylol are mixed with 40 parts of the alkyd resin solution and the mixture is added to 50 parts of a 4% aqueous solution of the emulsifying ester described in Example 1. The addition is effected during rapid stirring by an emulsifying tool as in Example 1.

An emulsion is obtained which is stable after aging for from 12-18 hours. The emulsion when diluted from 50% to 5% resin phase, is stable in the presence of 5% solutions of hydrochloric and sulfuric acids after aging for from 12-18 hours.

Example 6

Example 5 is repeated except that 50 parts of a mixture of 13.5% butylated urea-formaldehyde resin and 54.9% alkyd resin are used. The emulsion obtained is stable.

Example 7

50 parts of the same resin solution as used in

Example 6 is added to 50 parts of a 4% aqueous solution of the emulsifying ester of Example 4. The emulsion obtained is stable.

*Example 8*

50 parts of a butylated urea-formaldehyde resin in 30 parts butanol and 20 parts xylol are added to 100 parts of a 4% aqueous solution of the emulsifying ester of Example 1, the addition being accompanied by rapid stirring by means of an emulsifying tool as in Example 1. The emulsion obtained is stable and has a pH of 2.8.

*Example 9*

The resin solution of Example 8 is added to the emulsifying ester of Example 3 according to the usual procedure so that the product obtained is 50% resin solution, 48% water and 2% emulsifying agent. A stable emulsion is obtained.

*Example 10*

An alkyd resin is prepared by bringing about reaction between about 150 parts phthalic acid anhydride, about 60 parts of glycerol and about 450 parts of mixed soya bean, linseed and castor oils. 50 parts of the resin are added during rapid stirring to 50 parts of a 4% solution of an ester obtained by heat polymerizing fatty acids of soya bean or cotton seed oil and condensing the resulting dimerized linoleic and/or linolenic acid with polyethylene glycol having a molecular weight of about 1500. A stable emulsion is obtained, 50% of which however creams.

*Example 11*

50 parts of the alkyd resin described in Example 10 are added to 50 parts of a 4% aqueous solution of the emulsifying ester of Example 3. A stable emulsion is obtained.

*Example 12*

50 parts of the resin described in Example 10 are added to 50 parts of a 4% aqueous solution of the emulsifying ester described in Example 1 according to the usual procedure. A stable emulsion is obtained, 50% of which, however, creams in five weeks' time.

*Example 13*

A resin is obtained by reacting in stoichiometric proportions fumaric acid and rosin. About 250 parts of this resin, about 60 parts of glycerol and about 450 parts of mixed soya bean and linseed oils are combined and 50 parts of the resulting alkyd resin which has an acid number of about 14 are added to 50 parts of a 4% aqueous solution of the emulsifying ester of Example 4 according to the usual procedure. The emulsion obtained has an off-white color and is stable.

*Example 14*

50 parts of an ester gum prepared from hydrogenated rosin and glycerol are added in the usual manner to 50 parts of a 4% aqueous solution of the emulsifying ester of Example 4. A stable emulsion is obtained.

*Example 15*

An alkyd resin is obtained by bringing about reaction between about 150 parts phthalic acid anhydride, about 120 parts glycerol and about 125 parts of benzoic acid. 31.5 parts of this resin are dissolved in 13.5 parts of toluene and the solution is heated to 110° C. The heated resin solution is then added to 51 parts of an 8% aqueous solution of the emulsifying ester of Example 3 which is at a temperature of 80° C. The emulsion obtained is stable.

Other esters of dimerized fatty acids and polyalkylene oxides prepared as described in our copending application, Serial No. 453,756 filed August 5, 1942, may be substituted for those of the specific examples. For example, the unsaturated fatty acids of soybean oil, cottonseed oil, castor oil, linseed oil, tung oil and the like may be polymerized by heating and then condensed with polyethylene oxides having molecular weight varying from about 300 to about 6000. The best products are obtained with polyethylene oxide with a molecular weight of the order of 4000. The polyethylene oxides are the most readily available and the cheapest and hence are the most practicable commercially, but other water-soluble polyalkylene oxides as, for example, the polypropylene oxides may be used in the preparation of the esters.

In addition to esters in which the acid component is a polymeric long chain fatty acid, it is possible also to prepare esters in which part of the acid component is a polymeric acid and part is a monomeric acid. This monomeric acid may be the same as, or different from, the monomer of the polymeric acid. The mixed esters have similar emulsifying properties.

Reaction conditions covering the preparation of the esters which are the emulsifying agents of the present invention are not critical. For example, a considerable range of temperature is suitable, excellent results being obtained at about 140°–150° C. Moreover, while it is ordinarily preferable to use substantially stoichiometric proportions of the acid and polyalkylene oxide, this ratio of reactants may be varied, affecting in no way the character of the product obtained but only its yield.

For example, the emulsifying agent of Example 1 is prepared as follows: 21 parts (1 mol) of an unhydrogenated dimeric, dibasic, fatty acid obtained by heat-treating the fatty acid of soybean oil and vacuum distilling off the monomeric acid are condensed with 300 parts (2 mols) of polyethylene oxide of molecular weight 4,000 in the presence of 6 parts of sulfuric acid (sp. gr. 1.83). The reactants are heated for two hours at about 140° C. The product is a brown, oil liquid which solidifies on cooling to a hard, wax-like solid. This may be pulverized to a whitish powder which is soluble in water, benzene, ethyl alcohol, acetone and ethyl acetate.

Stable emulsions of a wide variety of synthetic resins may be prepared using the esters described in our copending application referred to above as emulsifying agents. Thermosetting resins which may be emulsified according to the present invention include phenol-aldehyde, cresol- and other alkyl phenol-aldehyde condensation products; condensation products of urea, methylolurea, methylated methylol urea and other alkylated ureas obtained by condensing urea with a saturated aliphatic alcohol and an aldehyde, melamine, and alkylated melamine condensation products such as described in Patent No. 2,197,357; alkyd resins; copolymers of vinyl compounds with unsaturated alkyd resins such as described in the Ellis Patent No. 2,255,313; etc. Thermoplastic resins which may likewise be emulsified include polyvinyl compounds such as polystyrene, copolymers of different type vinyl compounds such as vinyl chloride and vinyl acetate, thermoplastic phenol-formaldehyde resins such as phenol-acetaldehyde and phenol-furfural resins, esters of rosin with polyhydric alcohols such as glycerol, pentaerythritol, etc.

The present invention is not limited to the use of any particular proportion of emulsifying agent or to the use of solutions of any particular concentration. In general, we prefer using about 2% of the emulsifying agent based on the total weight of the emulsion but satisfactorily stable emulsions may be obtained if this figure is varied from about 1% to about 5%. A 4% aqueous solution of the emulsifying agent has been used in most applications but stronger or weaker solutions, ranging from about 2% to about 10% may also be used if desired.

The present invention is not limited to any particular method of preparation of the resin emulsions. Direct addition of the oil phase which comprises resin or a resin solution to the water phase which comprises the aqueous solution of emulsifier is a satisfactory method of producing the emulsions. However, the emulsions may also be prepared by the inversion method according to which the water phase is added to the resin phase.

Any method of providing rapid agitation during the period of addition may be used. For example, any commercial colloid mill, homogenizer or high speed stirring device effecting thorough localized mixing at the point of addition of the phases may be used to stabilize the emulsion.

The resin emulsions may have pigments or dyes incorporated therewith. For example, they may be colored by the addition of carbon black, iron blue, chrome yellow, lithopone, etc. Similarly, if desired, various plasticizers and thickeners such as water-soluble methylated cellulose ether may also be added.

The resin emulsions of the present invention, either pigmented or unpigmented, find wide application in paints, lacquers and varnishes. They may also be used to coat and/or impregnate leather, textiles, paper and other fibrous cellulosic material.

In the present specification and claims, the term "stable" is used to describe an emulsion which shows no separation over an aging period of from 12 to 18 hours. In most cases the emulsions showed no separation at all within that period of time and for that matter, within considerably longer periods of time.

This is a continuation-in-part of our copending application, Serial No. 453,756 filed August 5, 1942, and now abandoned.

We claim:

1. A stable emulsion of water and synthetic resin which includes, as a non-ionic emulsifying agent, an ester of a dicarboxylic acid of the alicyclic series obtained by the heat dimerization of poly-unsaturated long chain fatty acids with a polymerization product of an alkylene oxide of 2 to 3 carbon atoms having a molecular weight of from 300 to 6000.

2. A stable emulsion of water and synthetic resin which includes, as a non-ionic emulsifying agent, an ester of a dicarboxylic acid of the alicyclic series obtained by the heat dimerization of polyunsaturated long chain fatty acids with a polyethylene oxide having a molecular weight of the order of 4000.

3. A stable emulsion of water and a thermosetting synthetic resin according to claim 2.

4. A stable emulsion of water and a thermoplastic synthetic resin according to claim 2.

5. A stable emulsion, according to claim 2, of water and a thermosetting synthetic resin which is a condensation product of an aldehyde, a saturated aliphatic alcohol and member of the group consisting of urea and aminotriazines.

6. A stable emulsion, according to claim 2, of water and a thermosetting synthetic resin which is an alkyd resin.

7. A stable emulsion according to claim 2, of water and a mixture of thermosetting synthetic resins which comprises an alkyd resin and an aldehyde condensation product of at least one member of the group consisting of urea and aminotriazines.

8. A stable emulsion, according to claim 2, of water and a thermosetting synthetic resin which is a condensation product of an aldehyde, a saturated aliphatic alcohol and urea.

9. A stable emulsion, according to claim 2, of water and a thermosetting synthetic resin which is a condensation product of an aldehyde, a saturated aliphatic alcohol and melamine.

10. A process of preparing a stable resin emulsion which comprises bringing together synthetic resin and water in the presence of an ester of a dicarboxylic acid of the alicyclic series obtained by the heat dimerization of polyunsaturated long chain fatty acids and a polymerization product of an alkylene oxide of 2 to 3 carbon atoms having a molecular weight of from 300 to 6000.

11. A process as in claim 10 in which the polymerization product is a polyethylene oxide having a molecular weight of the order of 4000.

ROY H. KIENLE.
GORDON P. WHITCOMB.

REFERENCES CITED

The following references are of record in the file of this patent:

UNITED STATES PATENTS

| Number | Name | Date |
|---|---|---|
| 1,930,853 | Kollak et al. | Oct. 17, 1933 |
| 2,162,971 | Ralston | June 20, 1939 |